US010665268B1

(12) United States Patent
Tanaka (10) Patent No.: US 10,665,268 B1
(45) Date of Patent: May 26, 2020

(54) AUDIO-VIDEO ANALYTICS FOR SIMULATION-BASED TRAINING

(71) Applicant: Sony Corporation, Tokyo (JP)

(72) Inventor: Kenji Tanaka, Santa Clara, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/451,847

(22) Filed: Jun. 25, 2019

Related U.S. Application Data (60) Provisional application No. 62/811,299, filed on Feb. 27, 2019.

(51) Int. Cl.
| | |
|---|---|
| H04N 9/80 | (2006.01) |
| H04N 5/92 | (2006.01) |
| G11B 27/34 | (2006.01) |
| G06K 9/00 | (2006.01) |
| G09B 19/00 | (2006.01) |
| G11B 27/19 | (2006.01) |
| G09B 5/06 | (2006.01) |

(52) U.S. Cl.
CPC .......... *G11B 27/34* (2013.01); *G06K 9/00335* (2013.01); *G06K 9/00718* (2013.01); *G09B 5/065* (2013.01); *G09B 19/003* (2013.01); *G11B 27/19* (2013.01)

(58) Field of Classification Search
CPC .......... G06K 9/00771; G06K 9/00718; H04N 21/44213; H04N 21/47205; H04N 21/812

USPC .......... 386/241, 245, 248, 278, 280
See application file for complete search history.

(56) References Cited

U.S. PATENT DOCUMENTS

| | | | |
|---|---|---|---|
| 2005/0081159 A1* | 4/2005 | Gupta | G06F 16/48 715/751 |
| 2005/0181342 A1 | 8/2005 | Toly | |
| 2015/0004572 A1* | 1/2015 | Bomer | G09B 9/042 434/219 |
| 2016/0111021 A1 | 4/2016 | Knoche et al. | |

FOREIGN PATENT DOCUMENTS

| | | | |
|---|---|---|---|
| CN | 108875525 A | * | 11/2018 |
| CN | 208156892 | | 11/2018 |

\* cited by examiner

*Primary Examiner* — Robert Chevalier
(74) *Attorney, Agent, or Firm* — Trellis IP Law Group, PC (57) ABSTRACT

Implementations generally relate to audio-video analytics for simulation-based training. In some implementations, a method includes obtaining a video. The method further includes detecting one or more observed actions of a user in the video. The method further includes matching the one or more observed actions with one or more predetermined key actions. The method further includes annotating the video with annotations based on the matching of the one or more observed actions with the one or more predetermined key actions.

20 Claims, 6 Drawing Sheets

AUDIO-VIDEO ANALYTICS FOR SIMULATION-BASED TRAINING

CROSS REFERENCE TO RELATED APPLICATIONS

This application claims priority from U.S. Provisional Patent Application No. 62/811,299, entitled "AUDIO-VISUAL ANALYTICS FOR SIMULATION-BASED TRAINING," filed Feb. 27, 2019, which is hereby incorporated by reference as if set forth in full in this application for all purposes.

BACKGROUND

Simulation-based training is widely used in different fields of education including healthcare and medical education. An example application is objective structured clinical examination (OSCE), which involves video-based grading of students' clinical skills. The grading process is manually done, which is time consuming for evaluators and teachers.

SUMMARY

Implementations generally relate to audio-video analytics for simulation-based training. In some implementations, a system includes one or more processors, and includes logic encoded in one or more non-transitory computer-readable storage media for execution by the one or more processors. When executed, the logic is operable to cause the one or more processors to perform operations including obtaining a video; detecting one or more observed actions of a user in the video; matching the one or more observed actions with one or more predetermined key actions; and annotating the video with annotations based on the matching of the one or more observed actions with the one or more predetermined key actions.

With further regard to the system, in some implementations, the one or more predetermined key actions comprise one or more of key movements and key words. In some implementations, the logic when executed is further operable to cause the one or more processors to perform operations comprising characterizing the one or more observed actions of the user. In some implementations, the logic when executed is further operable to cause the one or more processors to perform operations comprising detecting, from the one or more observed actions, one or more of observed movements of the user and observed words of the user. In some implementations, the annotations characterize the one or more observed actions. In some implementations, the annotations comprise a timeline and one or more markers. In some implementations, the logic when executed is further operable to cause the one or more processors to perform operations comprising enabling the video to be played with the annotations.

In some embodiments, a non-transitory computer-readable storage medium with program instructions thereon is provided. When executed by one or more processors, the instructions are operable to cause the one or more processors to perform operations including obtaining a video; detecting one or more observed actions of a user in the video; matching the one or more observed actions with one or more predetermined key actions; and annotating the video with annotations based on the matching of the one or more observed actions with the one or more predetermined key actions.

With further regard to the computer-readable storage medium, in some implementations, the one or more predetermined key actions comprise one or more of key movements and key words. In some implementations, the logic when executed is further operable to cause the one or more processors to perform operations comprising characterizing the one or more observed actions of the user. In some implementations, the logic when executed is further operable to cause the one or more processors to perform operations comprising detecting, from the one or more observed actions, one or more of observed movements of the user and observed words of the user. In some implementations, the annotations characterize the one or more observed actions. In some implementations, the annotations comprise a timeline and one or more markers. In some implementations, the logic when executed is further operable to cause the one or more processors to perform operations comprising enabling the video to be played with the annotations.

In some implementations, a method includes obtaining a video; detecting one or more observed actions of a user in the video; matching the one or more observed actions with one or more predetermined key actions; and annotating the video with annotations based on the matching of the one or more observed actions with the one or more predetermined key actions.

With further regard to the method, in some implementations, the one or more predetermined key actions comprise one or more of key movements and key words. In some implementations, the logic when executed is further operable to cause the one or more processors to perform operations comprising characterizing the one or more observed actions of the user. In some implementations, the logic when executed is further operable to cause the one or more processors to perform operations comprising detecting, from the one or more observed actions, one or more of observed movements of the user and observed words of the user. In some implementations, the annotations characterize the one or more observed actions. In some implementations, the annotations comprise a timeline and one or more markers.

A further understanding of the nature and the advantages of particular implementations disclosed herein may be realized by reference of the remaining portions of the specification and the attached drawings.

DETAILED DESCRIPTION

Implementations generally relate to audio-video analytics for simulation-based training. As described in more detail below, in various implementations, a system obtains a video. The system detects one or more observed actions of a target user in the video. The target user may be a student being evaluated by a teacher, for example. The system matches observed actions of the target user with predetermined key actions that may be expected of the target user to perform. The system annotates the video with annotations based on the matching of the observed actions with the predetermined key actions. This enables an evaluator or teacher to access from the video the quality of the observed actions performed by the target user.

Figure 1:
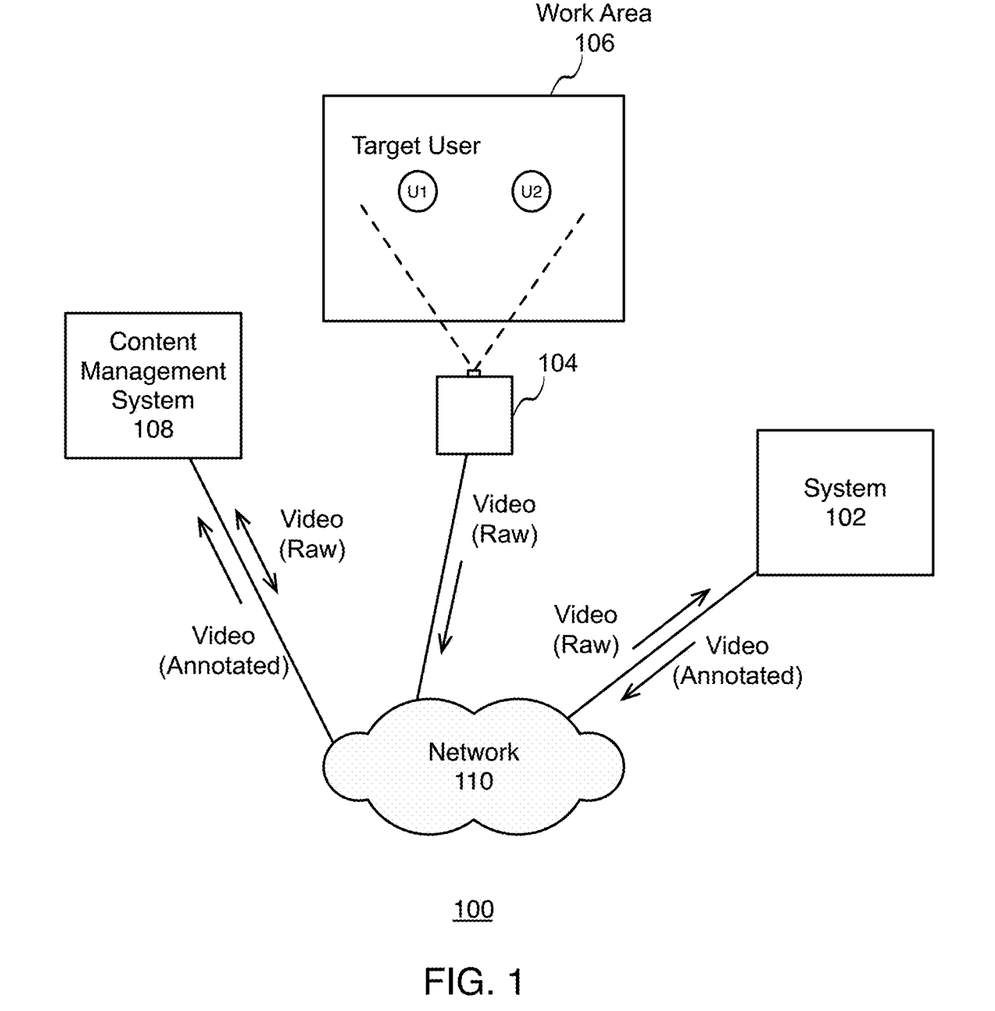
FIG. 1 illustrates a block diagram of an example environment for providing audio-video analytics for simulation-based training, which may be used for implementations described herein.

FIG. 1 illustrates a block diagram of an example environment 100 for providing audio-video analytics for simulation-based training, which may be used for implementations described herein. Shown is a system 102, which performs various implementations described herein. System 102 controls a camera 104, which captures video of a work area 106.

In this example scenario, there are two people or users in work area 106. The video may be a video recorded by camera 104 for the purposes of training one of users U1 and U2 or otherwise observing behavior of users U1 and U2. For ease of illustration, the user being evaluated is user U1, and may also be referred to as the target user, evaluated user, or observed user.

System 102 causes camera 104 to capture video of the activity in a work area 106. Camera 104 may send the raw video from camera 104 to content management system 108 via a network 110. The video may be a video file or a live video stream. System 102 may obtain the raw video from content management system 108 via network 110. Alternatively, system 102 may obtain the raw video directly from camera 104 via network 110. As described in more detail herein, the system annotates the video based on observed actions compared against key actions.

In various implementations, the annotated video may be used to facilitate various activities such as a simulation-based training. As described in more detail herein, the system annotates a given video in order to facilitate a teacher and/or student study particular activities. For example, a teaching nurse may observe the interactions between a student nurse and a patient. The annotated video may guide the teacher and/or student in analyzing and assessing the performance of the student in the video. For example, the annotative video may indicate critical or key actions performed by the student (e.g., washing hands, measuring vitals of the patient, interviewing the patent, etc.). The system may facilitate the evaluator or teacher during a debriefing session to determine if any target key actions are properly done. This accelerates the process of evaluation by highlighting the detected key actions. While some implementations are described in the context of healthcare, these implementations and others may also be applied to other fields such as education generally, law enforcement, aviation, etc.

Figure 2:
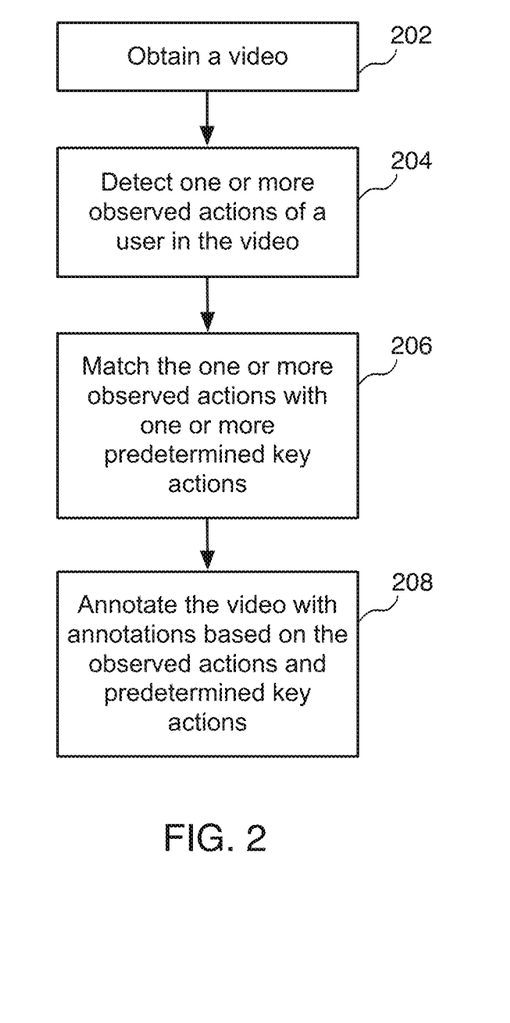
FIG. 2 is an example flow diagram for providing audio-video analytics for simulation-based training, according to some implementations.

FIG. 2 is an example flow diagram for simulated training, according to some implementations. Referring to both FIGS. 1 and 2, a method is initiated at block 202, where a system such as system 102 obtains a video. In some implementations, the system may obtain the video by receiving the video from a content management system. In some implementations, the system may obtain the video by accessing or retrieving the video from a storage location. In various implementations, the video may be created with a camera such as camera 104 capturing footage of the activity in a physical environment such as work area 106. In some implementations, the video may be captured and stored at camera 104 and subsequently sent in a file to content management system 106 and/or system 102. In some implementations, the video may be streamed live to content management system 106 and/or system 102. In various implementations, the system may process the video in either a streamed format or a file format.

At block 204, the system detects one or more observed actions of a user in the video. In various implementations, the video may include raw video data and raw audio data. As such, for ease of illustration, the term video may be used to refer to all content of a video including both video data and audio data. For clarity, video data alone without an audio component may be referred to as video data or raw video data, and audio data alone may be referred to as audio data or raw audio data.

Figure 3:
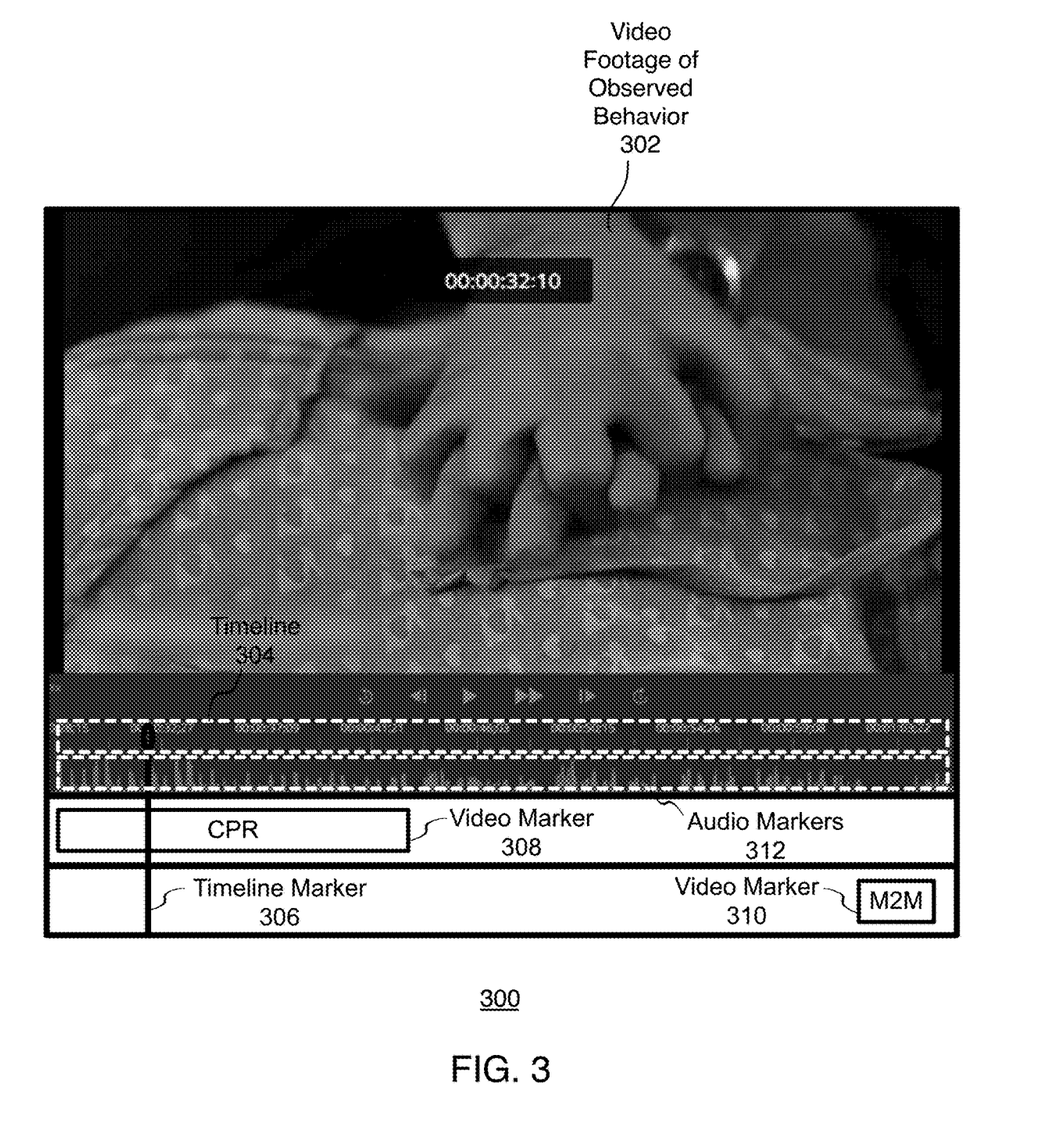
FIG. 3 is an example user interface displaying video footage of observed behavior and analytics for simulation-based training, according to some implementations.

FIG. 3 is an example user interface 300 displaying video footage of observed behavior and analytics for simulation-based training, according to some implementations. As shown, user interface 300 is displaying video footage of observed behavior 302. User interface 300 also includes a time line 304 and a timeline marker 306 indicating where the current image frame falls chronologically in the video and in timeline 304.

User interface 300 also includes video marker 308, video marker 310, and audio markers 312. These aspects of FIG. 3 are described in more detail herein, in connection with blocks 206 and 208, for example.

At block 206, the system matches the one or more observed actions with one or more predetermined key actions. In various implementations, the predetermined key actions or behaviors may include key movements performed by the user and/or may contain key words spoken by the user. For example, key movements may include movements associated with cardiopulmonary resuscitation, mouth-to-mouth resuscitation, etc. These particular example key movements are associated with the healthcare field. Other key actions and associated movements may vary depending on the particular implementations. For example, key movements may be associated with fields in law enforcement, military, food service, finance, etc.

In various implementations, the system characterizes the observed actions of the user that the system observes in the video. As indicated above, such key actions may include key movements and key words, which the system analyzes, characterizes, and marks or flags automatically without user intervention. For example, such key movements may include finer movements such as hand motions (e.g., waving or other gestures, etc.), facial expressions (e.g., indicating thinking, confusion, happiness, etc.), activities (e.g., writing, sketching, sitting, standing, walking, etc.).

Key words may include words associated with a particular key activity. For example, if a student nurse is consulting with a patient, key words may include words expected in an interview between the nurse and the patient (e.g., feeling, pain, breath, etc.). Such key movements and key words which constitute broader actions may be, for example, a series of movements related to a particular activity such as cardiopulmonary resuscitation, mouth-to-mouth resuscitation, etc.

In various implementations, the system detects movements performed by the user (referred to as observed movements) and/or observed words spoken by the user. For example, referring to FIG. 3, the key action is cardiopulmonary resuscitation. The system may detect and characterize particular observed movements such as one hand of a target user being placed over the other hand of the user, and both hands being placed on the chest of another user. The system may match the observed movements to key predetermined movements associated with cardiopulmonary resuscitation.

In another example, if the target user under observation administers a test for vitals (e.g., taking blood pressure, etc.), the system may detect a blood pressure monitor, may detect the target user handling the blood pressure monitor, and may detect a blood pressure cuff that is placed on the arm of another user or patient. The taking of blood pressure may also be a key action of several actions to be observed during the session. The system may then compare the observed behavior of the target user taking the blood pressure of a patient and match the observed behavior to the key action of taking blood pressure. The particular key actions may vary, depending on the particular application. For example, particular actions may include particular actions that are specific to a medical field, school, field, etc.

At block 208, the system annotates the video with annotations based on the matching of one or more observed actions with one or more predetermined key actions. In various implementations, the annotations characterize the one or more observed actions. For example, referring to FIG. 3, as indicated above, user interface 300 includes video marker 308 and video marker 310, which indicate observed behavior corresponding to matched key actions.

As indicated above, the annotations include timeline 304 and one or more markers such as video markers 308 and 310. In various implementations, the system enables the video to be played with the annotations. This enables a user such as an evaluator or teacher to evaluate the quality of actions and or quality of communication of the target user. As such, the evaluator or teacher may moderate or provide guidance to the target user or student as needed.

As shown in FIG. 3, video marker 308 indicates an observed action associated with cardiopulmonary resuscitation (CPR), where the length of video marker 308 maps to timeline 304. In this example, timeline marker 306 is positioned over a portion of video marker 308 at a particular point in timeline 304 (e.g., 00:00:32:10).

User interface 300 also includes audio markers 312, which may include vertical bars corresponding to points in timeline 304 when the microphone associated with the camera captures audio. For example, the microphone may record a conversation of the users in the video. In some implementations, audio markers 312 may include volume indications, indicated by the length of the vertical bars. For example, a longer bar may indicate more volume and a shorter bar may indicate less volume.

In some implementations, in addition to enabling a user or users to listen to particular audio, the system may also list observed words spoken at the time that match key words associated with the session. For example, the evaluator and/or teacher may expect the student to discuss a particular topic and may detect when key words are uttered. In other words, the system determines when observed words that are spoken match predetermined key words on a list.

In various implementations, the system may include key words in association with audio markers 312. For example, in some implementations, the system may show a list of key words over a particular portion of audio markers 312. Such words may appear by default or alternatively when a user hovers a mouse or other input device. In some implementations, the system may enable the user to select a portion (e.g., bar, etc.) of audio markers 312, after which the system displays a list of key words spoken.

The particular annotations may vary, depending on the particular implementation. For example, the system may determine and annotate where questions during a conversation were raised, if the conversation was balanced, the emotional tone of the conversation, where sound is directed, etc. In some implementations, the system may provide fields to enable another user such as an evaluator or teacher to added notes to the system generated annotations. Such notes may be helpful to the target user or to another evaluator or teacher during a subsequent viewing of the video.

Such annotations may be displayed in appropriate locations along the timeline, which makes searching for particular key actions quick and convenient for the evaluator user. For example, in various implementations, the video markers enable a user to such as an evaluator and/or teacher to quickly and conveniently navigate the video footage and learn of various aspects of the observed actions. For example, in some implementations, video marker 308 enables a user to conveniently view the video footage of particular actions such as the video footage of observed behavior 302. As described in more detail below in connection with FIG. 4, the system enables the user to conveniently jump to other observed actions matched to key actions.

Figure 4:
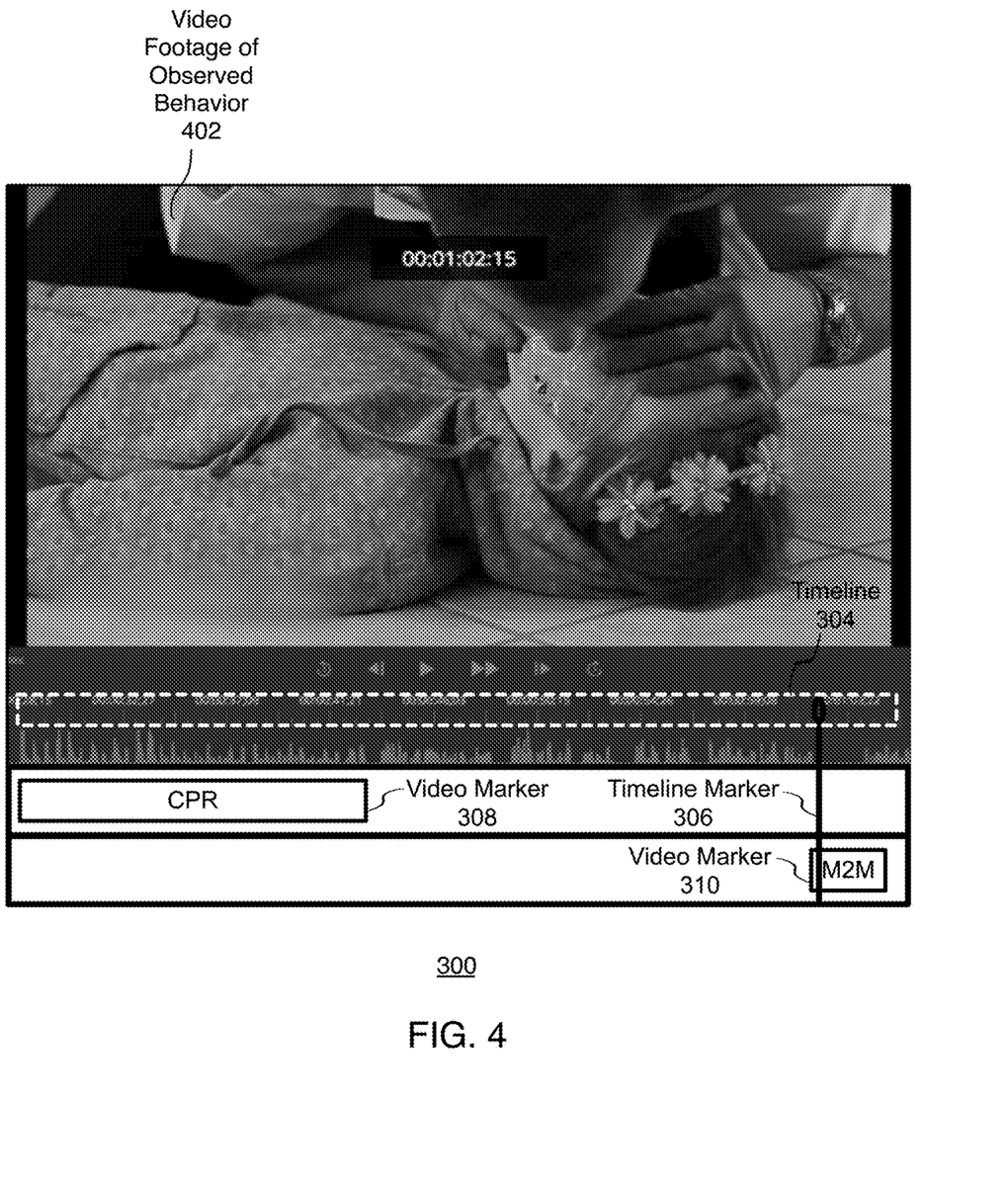
FIG. 4 is an example user interface displaying video footage of observed behavior and analytics for simulation-based training, according to some implementations.

FIG. 4 is the example user interface 300 of FIG. 3 displaying video footage of other observed behavior 402 and analytics for simulation-based training, according to some implementations. Referring to both FIGS. 3 and 4, in various implementations, if a user moves timeline marker 306 over a portion of video marker 308, the system jumps to the image frame corresponding to the new point in the timeline 304 indicated by timeline marker 306. For example, in FIG. 3, video marker 306 is positioned over video marker 308 (labeled CPR for cardiopulmonary resuscitation), in which case video footage of the user performing CPR is shown. In FIG. 4, timeline marker 306 is positioned over M2M video marker 310 (labeled M2M for mouth-to-mouth resuscitation), in which case video footage of the user performing mouth-to-mouth resuscitation is shown.

In some implementations, the system may color code different video markers or different audio markers in order to highlight key actions or key words. In some implementations, the system may rank the importance or urgency of particular key actions and differentially highlight different key actions accordingly. For example, a video marker associated with a critical key actions such as CPR may have red color coding. In contrast, a video marker associated with a non-critical key actions such as generally interviewing may have no color coding or more subdued color coding (e.g., grey, brown, blue, etc.). The particular color coding or other labels may vary, and will depend on the particular implementation.

In the examples above, observed actions captured as video data may include various user behaviors and actions including CPR, mouth-to-mouth resuscitation, etc. Other user behaviors or actions are possible, depending on the particular implementation. For example, in some implementations, the system may observe user-associated behaviors such as (heartbeat), eye gaze, head movement, body movement, etc. Such specific behavior may constitute broader or more general actions and/or series of actions such as CPR, mouth-to-mouth resuscitation, interviewing, etc. Also, a particular movement or spoken word may be associated with different broader key actions, and the system determines such key actions.

The system may use any suitable facial and/or pattern recognition techniques to observe visual behavior. Observed actions captured as audio data may include various user behaviors including particular words uttered by a user, the frequency of words uttered by a user, the volume of the user, etc. The system may use any suitable natural language, and/or speech or pattern recognition techniques to observe auditory behavior.

In some implementations, the system may detect discussion contents, including key words or key themes that arise in the video data. For example, if any words are printed on paper and/or written down on paper or a whiteboard, the system may detect some of the words for analysis. Furthermore, the system may detect discussion contents, including key words or key themes that arise in the audio data. For example, if any words are spoken by a user or any participant in the work area, the system may detect some of the words for analysis.

In some implementations, the system enables an evaluator user to alter aspects of the work area and/or simulation environment in order to more effectively teach the target user. For example, if the target user were measuring vitals of a patient that is actually a mannequin, the evaluator may increase or decrease the heart rate in order to observe how the target user responds. In some implementations, the system may include timing information in connection with a given key action. This enables evaluation of the timing of a particular action (e.g., responding to an emergency situation in a timely manner, washing hands for a sufficient length of time, etc.).

In various implementations, the system sends the video with annotations to the content management system. The content management system may then use the video and annotations for facilitating a simulation-based training system. In various implementations, the video and associated data may be stored in any suitable file and may include interexchangeable metadata and/or other forms of metadata.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Implementations described herein provide various benefits. For example, implementations facilitate in simulation-based training. Implementations described herein enable an evaluator or teacher to view and study video footage and associated annotations in order to determine the quality of actions of a target user or student.

Figure 5:
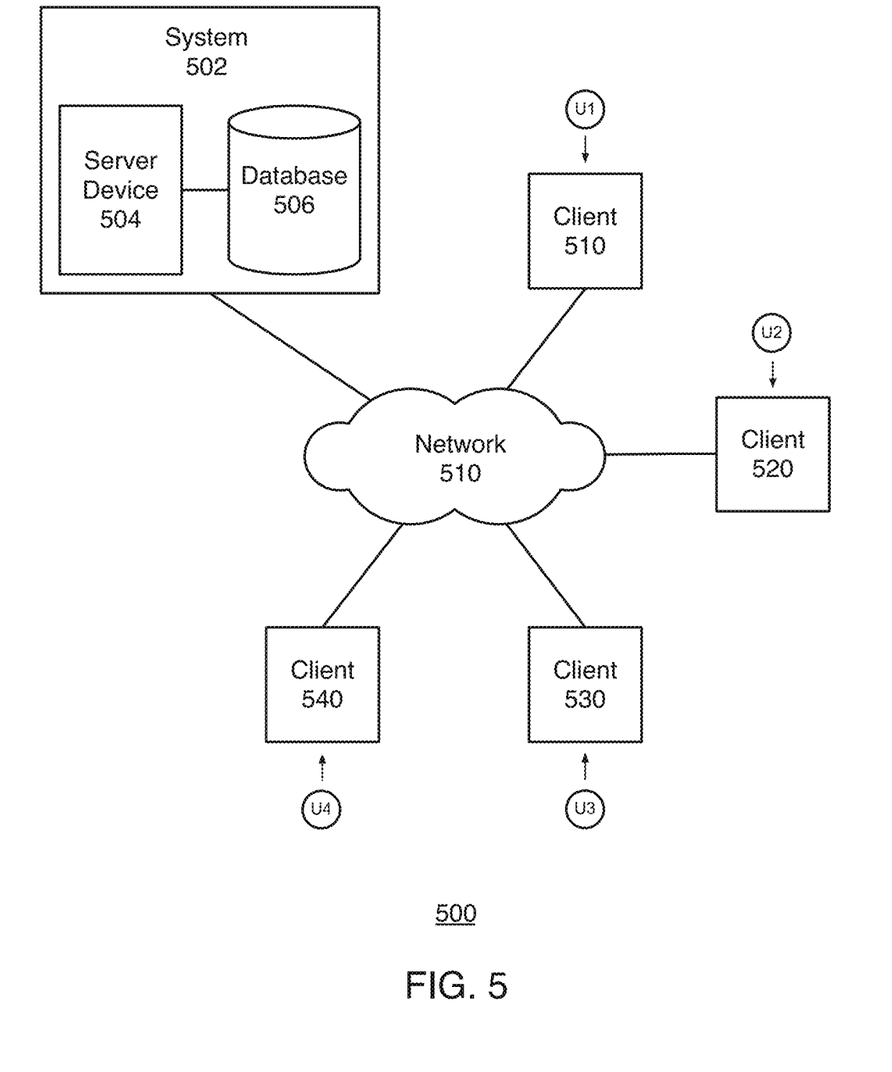
FIG. 5 is a block diagram of an example network environment, which may be used for implementations described herein.

FIG. 5 is a block diagram of an example network environment, which may be used for implementations described herein. In some implementations, network environment 500 includes a system 502, which includes a server device 504 and a database 506. Network environment 500 also includes client devices 510, 520, 530, and 540, which may communicate with system 502 and/or may communicate with each other directly or via system 502. Network environment 500 also includes a network 550 through which system 502 and client devices 510, 520, 530, and 540 communicate. Network 550 may be any suitable communication network such as a Wi-Fi network, Bluetooth network, the Internet, etc.

In various implementations, system 502 may be used for providing audio-video analytics for simulation-based training. Also, client devices 510, 520, 530, and 540 may be used to implement various devices for simulation-based training. For example, some client devices may function as cameras for capturing observed behavior. Some client devices may used to show annotated videos for debriefing, etc.

For ease of illustration, FIG. 5 shows one block for each of system 502, server device 504, and network database 506, and shows four blocks for client devices 510, 520, 530, and 540. Blocks 502, 504, and 506 may represent multiple systems, server devices, and databases. Also, there may be any number of client devices. In other implementations, network environment 500 may not have all of the components shown and/or may have other elements including other types of elements instead of, or in addition to, those shown herein.

While server 504 of system 502 performs embodiments described herein, in other embodiments, any suitable component or combination of components associated with server 502 or any suitable processor or processors associated with server 502 may facilitate performing the embodiments described herein.

Implementations may apply to any network system and/or may apply locally for an individual user. For example, implementations described herein may be implemented by system 502 and/or any client device 510, 520, 530, and 540. System 502 may perform the implementations described herein on a stand-alone computer, tablet computer, smartphone, etc. System 502 and/or any of client devices 510, 520, 530, and 540 may perform implementations described herein individually or in combination with other devices.

In the various implementations described herein, a processor of system 502 and/or a processor of any client device 510, 520, 530, and 540 causes the elements described herein (e.g., information, etc.) to be displayed in a user interface on one or more display screens.

Figure 6:
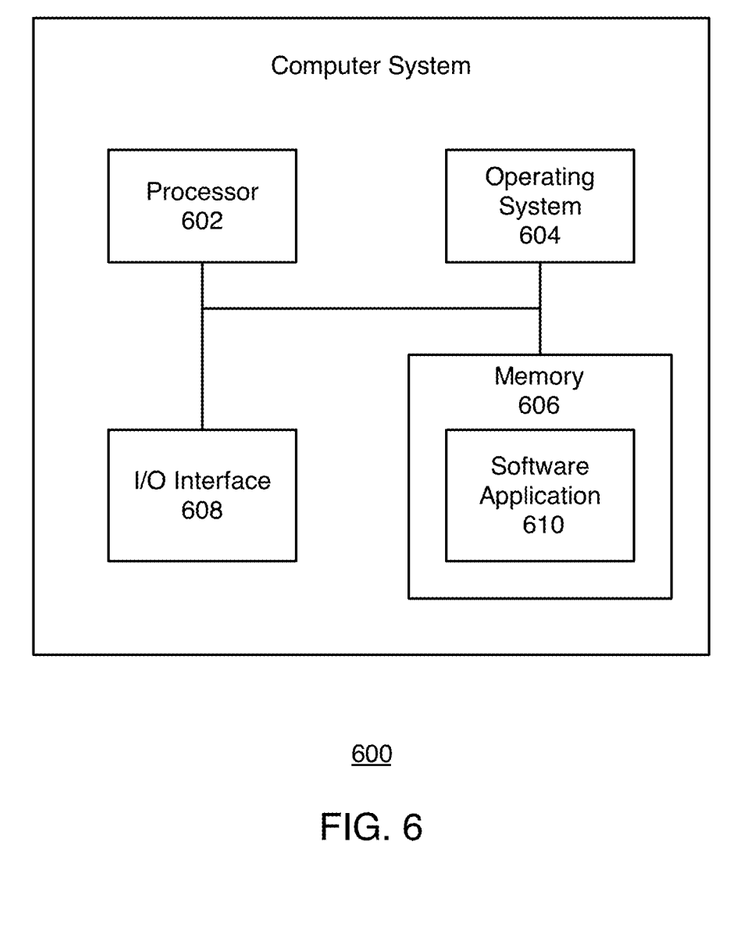
FIG. 6 is a block diagram of an example computer system, which may be used for some implementations described herein.

FIG. 6 is a block diagram of an example computer system 600, which may be used for some implementations described herein. For example, computer system 600 may be used to implement server device 504 of FIG. 5 and/or system 102 of FIG. 1, as well as to perform implementations described herein. In some implementations, computer system 600 may include a processor 602, an operating system 604, a memory 606, and an input/output (I/O) interface 608. In various implementations, processor 602 may be used to implement various functions and features described herein, as well as to perform the method implementations described herein. While processor 602 is described as performing implementations described herein, any suitable component or combination of components of computer system 600 or any suitable processor or processors associated with computer system 600 or any suitable system may perform the steps described. Implementations described herein may be carried out on a user device, on a server, or a combination of both.

Computer system 600 also includes a software application 610, which may be stored on memory 606 or on any other suitable storage location or computer-readable medium. Software application 610 provides instructions that enable processor 602 to perform the implementations described herein and other functions. Software application may also include an engine such as a network engine for performing various functions associated with one or more networks and network communications. The components of computer system 600 may be implemented by one or more processors or any combination of hardware devices, as well as any combination of hardware, software, firmware, etc.

For ease of illustration, FIG. 6 shows one block for each of processor 602, operating system 604, memory 606, I/O interface 608, and software application 610. These blocks 602, 604, 606, 608, and 610 may represent multiple processors, operating systems, memories, I/O interfaces, and software applications. In various implementations, computer system 600 may not have all of the components shown and/or may have other elements including other types of components instead of, or in addition to, those shown herein.

Although the description has been described with respect to particular embodiments thereof, these particular embodiments are merely illustrative, and not restrictive. Concepts illustrated in the examples may be applied to other examples and implementations.

In various implementations, software is encoded in one or more non-transitory computer-readable media for execution by one or more processors. The software when executed by one or more processors is operable to perform the implementations described herein and other functions.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory computer-readable storage medium (also referred to as a machine-readable storage medium) for use by or in connection with the instruction execution system, apparatus, or device. Particular embodiments can be implemented in the form of control logic in software or hardware or a combination of both. The control logic when executed by one or more processors is operable to perform the implementations described herein and other functions. For example, a tangible medium such as a hardware storage device can be used to store the control logic, which can include executable instructions.

Particular embodiments may be implemented by using a programmable general purpose digital computer, and/or by using application specific integrated circuits, programmable logic devices, field programmable gate arrays, optical, chemical, biological, quantum or nanoengineered systems, components and mechanisms. In general, the functions of particular embodiments can be achieved by any means as is known in the art. Distributed, networked systems, components, and/or circuits can be used. Communication, or transfer, of data may be wired, wireless, or by any other means.

A "processor" may include any suitable hardware and/or software system, mechanism, or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A system comprising:
one or more processors; and
logic encoded in one or more non-transitory computer-readable storage media for execution by the one or more processors and when executed operable to cause the one or more processors to perform operations comprising:
obtaining a video;
detecting one or more observed actions of a user in the video;
matching the one or more observed actions with one or more predetermined key actions; and
annotating the video with annotations based on the matching of the one or more observed actions with the one or more predetermined key actions.

2. The system of claim 1, wherein the one or more predetermined key actions comprise one or more of key movements and key words.

3. The system of claim 1, wherein the logic when executed is further operable to cause the one or more processors to perform operations comprising characterizing the one or more observed actions of the user.

4. The system of claim 1, wherein the logic when executed is further operable to cause the one or more processors to perform operations comprising detecting, from the one or more observed actions, one or more of observed movements of the user and observed words of the user.

5. The system of claim 1, wherein the annotations characterize the one or more observed actions.

6. The system of claim 1, wherein the annotations comprise a timeline and one or more markers.

7. The system of claim 1, wherein the logic when executed is further operable to cause the one or more processors to perform operations comprising enabling the video to be played with the annotations.

8. A non-transitory computer-readable storage medium with program instructions stored thereon, the program instructions when executed by one or more processors are operable to cause the one or more processors to perform operations comprising:

obtaining a video;

detecting one or more observed actions of a user in the video;

matching the one or more observed actions with one or more predetermined key actions; and annotating the video with annotations based on the matching of the one or more observed actions with the one or more predetermined key actions.

9. The computer-readable storage medium of claim 8, wherein the one or more predetermined key actions comprise one or more of key movements and key words.

10. The computer-readable storage medium of claim 8, wherein the instructions when executed are further operable to cause the one or more processors to perform operations comprising characterizing the one or more observed actions of the user.

11. The computer-readable storage medium of claim 8, wherein the instructions when executed are further operable to cause the one or more processors to perform operations comprising detecting, from the one or more observed actions, one or more of observed movements of the user and observed words of the user.

12. The computer-readable storage medium of claim 8, wherein the annotations characterize the one or more observed actions.

13. The computer-readable storage medium of claim 8, wherein the annotations comprise a timeline and one or more markers.

14. The computer-readable storage medium of claim 8, wherein the instructions when executed are further operable to cause the one or more processors to perform operations comprising enabling the video to be played with the annotations.

15. A computer-implemented method comprising:

obtaining a video;

detecting one or more observed actions of a user in the video;

matching the one or more observed actions with one or more predetermined key actions; and annotating the video with annotations based on the matching of the one or more observed actions with the one or more predetermined key actions.

16. The method of claim 15, wherein the one or more predetermined key actions comprise one or more of key movements and key words.

17. The method of claim 15, further comprising characterizing the one or more observed actions of the user.

18. The method of claim 15, further comprising detecting, from the one or more observed actions, one or more of observed movements of the user and observed words of the user.

19. The method of claim 15, wherein the annotations characterize the one or more observed actions.

20. The method of claim 15, wherein the annotations comprise a timeline and one or more markers.

* * * * *